United States Patent [19]

McKay

[11] 4,310,410
[45] Jan. 12, 1982

[54] CRACKING PROCESS

[75] Inventor: Dwight L. McKay, Bartlesville, Okla.

[73] Assignee: Phillips Petroleum Company, Bartlesville, Okla.

[21] Appl. No.: 229,209

[22] Filed: Jan. 28, 1981

Related U.S. Application Data

[62] Division of Ser. No. 65,826, Aug. 13, 1979, Pat. No. 4,263,172.

[51] Int. Cl.$^3$ .............................................. C10G 11/02
[52] U.S. Cl. ..................................... 208/120; 208/135
[58] Field of Search ................. 208/120, 135; 252/439

[56] References Cited

U.S. PATENT DOCUMENTS

| | | | |
|---|---|---|---|
| 3,583,903 | 6/1971 | Miale et al. | 208/120 |
| 3,772,185 | 11/1973 | Chang et al. | 208/251 H |
| 4,045,331 | 8/1977 | Ward | 208/213 |
| 4,178,267 | 12/1979 | McKay | 208/120 |
| 4,183,803 | 1/1980 | McKay | 208/120 |

Primary Examiner—Delbert E. Gantz
Assistant Examiner—G. E. Schmitkons

[57] ABSTRACT

Prevention of detrimental effects of metals such as nickel, vanadium and iron on the activity of cracking catalysts is achieved by contacting the cracking catalyst with manganese selenide. The modifying treatment of the catalyst with manganese selenide increases octane rating of the gasoline produced.

10 Claims, No Drawings

CRACKING PROCESS

This is a divisional application of my copending application having Ser. No. 065,826, filed Aug. 13, 1979, now U.S. Pat. 4,263,172.

The present invention relates to the art of catalytic cracking of hydrocarbons. More specifically, the invention relates to the modification of contaminated and uncontaminated cracking catalysts. In accordance with another aspect, this invention relates to modified cracking catalysts. Particularly, the invention relates to the modification of metals contaminated cracking catalysts.

BACKGROUND OF THE INVENTION

The primary purpose for catalytic cracking of hydrocarbons is the production of gasoline. Although the desired product distribution from this process may change, e.g., because of variations in seasonal demand, it is important to produce gasoline having the highest octane number, to minimize processing downstream from the cracking unit.

Methods by which the octane number of gasoline range hydrocarbons can be raised include increasing the branching of paraffins, dehydrogenating paraffins to mono-olefins, and converting both paraffins and olefins to aromatic hydrocarbons. This invention discloses a process by which the octane rating is increased on gasoline made by catalytic cracking over a catalyst that is contaminated with metals. The contamination results from processing feedstocks containing naturally occurring compounds of vanadium, iron, and nickel; adventitious metals from process equipment can also contribute to the catalyst contamination.

THE INVENTION

It is thus one object of this invention to provide a process for the modification of cracking catalysts.

A further object of this invention is to provide a process for the modification of contaminated and uncontaminated cracking catalysts.

Another object of this invention is to treat cracking catalysts contaminated with metals such as nickel, vanadium and iron to improve the octane rating of the produced gasoline.

Still another object of this invention is to provide an improved catalytic cracking process.

A further object of this invention is to provide a modified cracking catalyst.

Still a further object of this invention is to provide a cracking process by which the octane rating of the gasoline produced is increased.

Further objects, embodiments, advantages, features and details of this invention will become apparent to those skilled in the art from the following detailed description of the invention and the appended claims.

In accordance with this invention, cracking catalysts containing contaminating metals such as nickel, iron and vanadium on cracking catalysts as well as uncontaminated cracking catalysts are modified by treatment with manganese selenide. This modifying treatment increases the octane rating of the gasoline as compared to the unmodified catalyst.

In accordance with one embodiment of this invention, there is now provided a cracking catalyst consisting essentially of an unused or used catalytic cracking material useful for cracking hydrocarbons essentially in the absence of added hydrogen, and containing an effective modifying amount of manganese selenide sufficient to increase the octane rating of the gasoline produced when the modified cracking catalyst is employed in a hydrocarbon cracking process.

In accordance with a still further embodiment of this invention, the modified catalyst of this invention is one that has been prepared by modifying a clay based cracking catalyst with manganese selenide, preferably under reducing conditions. For the reducing conditions, it is preferred to employ a fluidizing hydrogen-containing medium in contact with the clay based cracking catalyst and the modifying compound. To achieve the advantages of the invention, it is preferred to have the reducing conditions prevailing when the clay based catalyst/modifying compound mixture is subjected to high temperatures for the first time. This initial treatment under elevated temperature conditions and in reducing surroundings generates a modification of the cracking catalyst that is not destroyed by subsequent regenerations or oxygen heat treatments. In this embodiment it is preferred to contact a clay based cracking catalyst contaminated with metals such as nickel, vanadium and iron with the modifying compound under elevated temperatures and under reducing conditions.

The term "clay based catalyst" can be any of those cracking catalysts conventionally employed in the catalytic cracking of hydrocarbons boiling above 400° F. (204° C.) for the production of gasoline, motor fuel, blending components and light distillates; this cracking procedure is carried out in the absence of added hydrogen. The conventional cracking catalysts generally contain silica-alumina, and are frequently associated with zeolitic materials. These zeolitic materials can be naturally occurring or synthetic; usually they have been ion exchanged by conventional ion exchange methods to improve the activity of the catalysts. The zeolite-modified silica-alumina catalysts are particularly applicable in the present invention. Examples of catalysts that can be used in the process of this invention include hydrocarbon cracking catalysts obtained by admixing an inorganic oxide gelled with a zeolite, e.g., an alumino-silicate, but also materials in which aluminum is replaced by gallium and materials in which silicon is replaced by germanium, and zeolites in which by one or several operations of cation exchange the alkali ions are replaced by a rare earth metal cation and hydrogen ion, or ions capable of conversion to a hydrogen ion. Other cracking catalysts useful in the process of the present invention include crystalline and aluminosilicate zeolites having the mordenite crystal structure. The surface area of the clay based cracking catalyst generally is about 70–200 m$^2$/g and the pore volume is around 0.2–0.4 ml/g. The cracking catalyst as a fresh catalytic material will generally be in particulate form having a particle size principally within the range of about 10 to about 200 microns.

Manganese selenide can be made, e.g., by direct combination of the elements with heat, by reduction of mixed aqueous solutions at 100° C. and atmospheric pressure with the elements in proper stoichiometric ratio by adding aqueous ammoniacal hydrazine, or by other suitable methods.

The modified catalyst of this invention consists essentially of a conventional cracking catalyst with a small amount of manganese selenide as a modifying compound. The quantity of manganese selenide added to the catalytic cracking material is an effective modifying amount sufficient to increase the octane rating of the gasoline produced when the catalyst is used in a hydrocarbon cracking process. Generally, the quantity of modifying compound is such that about 0.05 to about 5 wt. % of manganese selenide is deposited on or combined with the catalyst, this percentage being based on the weight of the cracking catalyst prior to treatment with the modifying compound.

The catalyst in accordance with a further embodiment of this invention is obtained by mixing a clay based cracking catalyst, for example, with finely divided manganese selenide as a modifying compound, and subjecting this mixture to an elevated temperature. This temperature is generally in the range of about 800° F. (427° C.) to about 1500° F. (816° C.). The finely divided modifying compound powder preferably is of such a particle size as to pass through a Tyler Standard Screen of about 150 mesh or finer. The modifying compound particles can have a diameter of about 0.1 to 0.03 mm. Smaller particles can be used.

The improved catalyst of this invention can be prepared by combining manganese selenide and the contaminated or uncontaminated catalytic cracking material. The manganese selenide can be combined with the catalytic cracking material in various ways. The catalytic cracking material can be combined with manganese selenide by admixing the catalytic cracking material and the manganese selenide in the dry stage. It is also within the scope of this invention to admix the catalytic cracking material and solid particulate manganese selenide in a slurry with a liquid carrier and to remove at least a portion of this liquid carrier. Manganese selenide that is finely divided, i.e., passing a 200 mesh sieve and preferably passing a 325 mesh sieve can be slurried into the hydrocarbon feedstock and introduced directly into the cracking zone. It is preferable, however, to premix manganese selenide and cracking catalysts before introducing modified catalysts to the cracking unit to assure a more uniform distribution of the treating material. However, the treating catalyst should be heated initially in a reducing environment such as in the cracking zone rather than in an oxidizing environment such as in a regenerator.

As indicated above, the actual mixing of the catalytic cracking material articles and the particulate manganese selenide can be carried out in a variety of ways. For example, the manganese selenide in finely divided form can be mixed with the catalytic cracking material by rolling, shaking, stirring, and similar procedures.

A preferred embodiment of the cracking process of this invention utilizes a cyclic flow of catalysts from a cracking zone to a regeneration zone. In this process, a hydrocarbon feedstock containing contaminating metals such as nickel, vanadium or iron is contacted in a cracking zone under cracking conditions with a manganese selenide containing cracking catalyst as defined above. A cracked product is obtained and recovered. The cracking catalyst is passed from the cracking zone into a regeneration zone. In the regeneration zone, the spent deactivated catalyst is regenerated by burning off coke from the catalyst with a free oxygen-containing gas. The modified cracking catalysts of the invention can be used in any of the well-known fluid and other catalytic cracking processes.

The term "used" or "contaminated" catalytic cracking material as employed in the present invention refers to a cracking catalyst material which contains at least one of nickel, vanadium or iron in varying amounts. The amounts of contaminating metals present on the catalyst can range from a trace up to about 1 wt. %. The term "unused" or "uncontaminated" catalytic cracking material as used herein refers to a cracking catalyst material which has not been used in a catalytic cracking process. The unused catalytic cracking material contains essentially no nickel, vanadium or iron.

The main component of the modified catalyst of this invention is a clay based catalyst which is commercially available.

The feedstock utilized in the cracking process of this invention can be any feedstock usually employed for catalytic cracking. Generally speaking, feedstocks are petroleum or crude oil or products therefrom. The feedstocks generally are hydrocarbon mixtures having boiling points above the boiling point range of gasoline, i.e., boiling point ranges above about 400° F. (about 200° C.). These hydrocarbon mixtures include such fluids as gas oils, fuel oils, topped crudes and shale oils.

The following example will illustrate this invention.

A commercial cracking catalyst that had been used in a commercial fluid catalytic cracker until it had attained equilibrium composition with respect to metal accumulation (catalyst was being removed from the process system at a constant rate) was used to demonstrate change of cracking selectivity with manganese selenide. The catalyst, being a synthetic zeolite combined with amorphous silica/alumina (clay), was predominantly silica and alumina. Concentrations of other elements together with pertinent physical properties are shown in Table I.

TABLE I

| | |
|---|---|
| Surface area, $m^2 \, gm^{-1}$ | 74.3 |
| Pore volume, $ml \, gm^{-1}$ | 0.29 |
| Composition, wt. % | |
| Vanadium | 0.60 |
| Iron | 0.90 |
| Nickel | 0.38 |
| Sodium | 0.39 |
| Cerium | 0.40 |
| Carbon | 0.06 |

A portion of this catalyst was combined with 1.95 wt. percent of added manganese selenide powder, and they were mixed well by shaking. The catalyst was prepared for testing by heating, while being fluidized with hydrogen, to 649° C. It was then purged with nitrogen, at that temperature, for 5 minutes, then contacted with air for 15 minutes.

The used catalyst and the manganese selenide-treated catalyst were evaluated in a fluidized bed reactor using topped West Texas crude oil as feedstock to the cracking step. The cracking reaction was carried out at 510° C. and atmospheric pressure for 0.5 minutes and the regeneration step was conducted at about 649° C. and atmospheric pressure for about 30 minutes using fluidized air, the reactor being purged with nitrogen before and after each cracking step.

Properties of the topped West Texas crude used in the cracking step are summarized in Table II.

TABLE II

| | | |
|---|---|---|
| API gravity at 15.6° C. | | 21.4° |
| Distillation (by ASTM D 1160-61) | | |
| IBP | 291° C. | |
| 10% | 428 | |
| 20% | 468 | |
| 30% | 498 | |
| 40% | 528 | |
| 50% | 555 | |
| Carbon, Ramsbottom | | 5.5 wt. % |

TABLE II-continued

| Analysis for some elements | | |
|---|---|---|
| Sulfur | 1.2 wt. % | |
| Vanadium | 5.29 ppm | |
| Iron | 29 ppm | |
| Nickel | 5.24 ppm | |
| Pour point (by ASTM D 97-66) | | 17° C. |
| Kinematic viscosity (by ASTM D 445-65) | | |
| at 82.2° C. | 56.5 centistokes | |
| at 98.9° C. | 32.1 centistokes | |

Results of the test using the two catalysts are summarized in Table III. Both catalysts were tested at 75 percent conversion.

TABLE III

| | | Yield | | | Gasoline | | | |
|---|---|---|---|---|---|---|---|---|
| Additive | Catalyst: Oil Weight Ratio | Gasoline Vol. % of Feed | Coke, Wt. % of Feed | SCF $H_2$/ Bbl Feed Converted | Octane No.* | Aromatics, Wt. % of Gasol | | |
| | | | | | | $C_6$ | $C_7$ | $C_8$ |
| None | 7.4 | 56.3 | 16.4 | 800 | 89.9 | 0.34 | 2.95 | 7.7 |
| MnSe | 7.5 | 54.8 | 17.0 | 880 | 90.6 | 0.43 | 3.45 | 8.66 |

*Calculated from GLC analysis, per Jour. of the Institute of Petroleum, 58, No. 560, pp. 83–94 (3/1972).

These comparative data show an increase of 0.7 units in the Research Octane Number of the gasoline made from manganese selenide-treated catalyst. The product analysis indicates that this is at least partially due to an increase in the yield of $C_6$ to $C_8$ aromatics.

I claim:

1. A process which comprises contacting a hydrocarbon feed containing contaminating metals with a cracking catalyst under cracking conditions to produce a gasoline fraction, the improvement which comprises contacting said catalyst with manganese selenide under conditions which are conducive to the deposition of manganese selenide on said catalyst in an amount sufficient to increase the octane rating of the gasoline produced.

2. A process according to claim 1 wherein said cracking catalyst is contacted under elevated temperature conditions and under reducing conditions with manganese selenide.

3. A process according to claim 2 wherein the manganese selenide modified cracking catalyst is heated at a temperature in the range of about 800° F. (427° C.) to about 1500° F. (816° C.) in the presence of a hydrogen-containing medium.

4. A process according to claim 2 comprising contacting said cracking catalyst with a sufficient amount of manganese selenide to add about 0.05 to about 5 weight percent manganese selenide to the cracking catalyst, said percent being based on the weight of the cracking catalyst prior to treatment with manganese selenide.

5. A process according to claim 1 wherein said cracking catalyst is a clay based cracking catalyst and said clay based cracking catalyst and manganese selenide are contacted and treated under elevated temperature conditions in the range of about 800°–1500° F. and in the presence of hydrogen-containing medium.

6. A process in accordance with claim 1 wherein a mixture of clay based cracking catalyst and manganese selenide is contacted with hydrogen in the cracking zone.

7. A process in accordance with claim 6 wherein manganese selenide is added to the hydrocarbon feedstock.

8. A proces according to claim 1 wherein manganese selenide and unused cracking catalyst are admixed prior to introduction into the cracking process.

9. A process according to claim 1 wherein a portion of used cracking catalyst containing contaminating metals such as nickel, vanadium, and iron is withdrawn from the process, contacted with manganese selenide, and reintroduced in the process.

10. A process according to claim 6 wherein said cracking catalyst is a synthetic zeolite combined with amorphous silica/alumina and is contacted with manganese selenide having a particle size such as to pass through a screen of at least about 150 mesh (Tyler Standard Screen).

* * * * *